(12) United States Patent
Starkey

(10) Patent No.: US 7,898,454 B1
(45) Date of Patent: Mar. 1, 2011

(54) RADAR JAMMING METHOD AND APPARATUS

(75) Inventor: Bertrand Julian Starkey, Ottawa (CA)

(73) Assignee: Her Majesty the Queen in right of Canada, as represented by the Minister of National Defense, Ottawa, Ontario (CA)

( * ) Notice: Subject to any disclaimer, the term of this patent is extended or adjusted under 35 U.S.C. 154(b) by 0 days.

(21) Appl. No.: 04/548,798

(22) Filed: May 9, 1966

(51) Int. Cl.
  *G01S 7/36* (2006.01)
(52) U.S. Cl. .............................................. 342/14; 455/1
(58) Field of Classification Search ............... 343/18 B, 343/18 E, 101, 100 CS; 342/14; 455/1
  See application file for complete search history.

(56) References Cited

U.S. PATENT DOCUMENTS 3,007,159 A * 10/1961 Dodington .................... 342/15
3,101,473 A *  8/1963 Fenlon, Jr .................... 343/760

\* cited by examiner

*Primary Examiner*—Mark Hellner
(74) *Attorney, Agent, or Firm*—Michael Zelenka

(57) ABSTRACT

A method of jamming radar apparatus carried by interceptor aircraft comprising producing a narrow radio beam of a frequency corresponding to the frequency of the radar apparatus carried by an attacking aircraft and directing the beam towards the earth to produce scattered radiation from the surface thereof which the radar of the interceptor will home on causing the interceptor to divert its course towards the scattering source.

4 Claims, 1 Drawing Sheet

RADAR JAMMING METHOD AND APPARATUS

Figure 1:
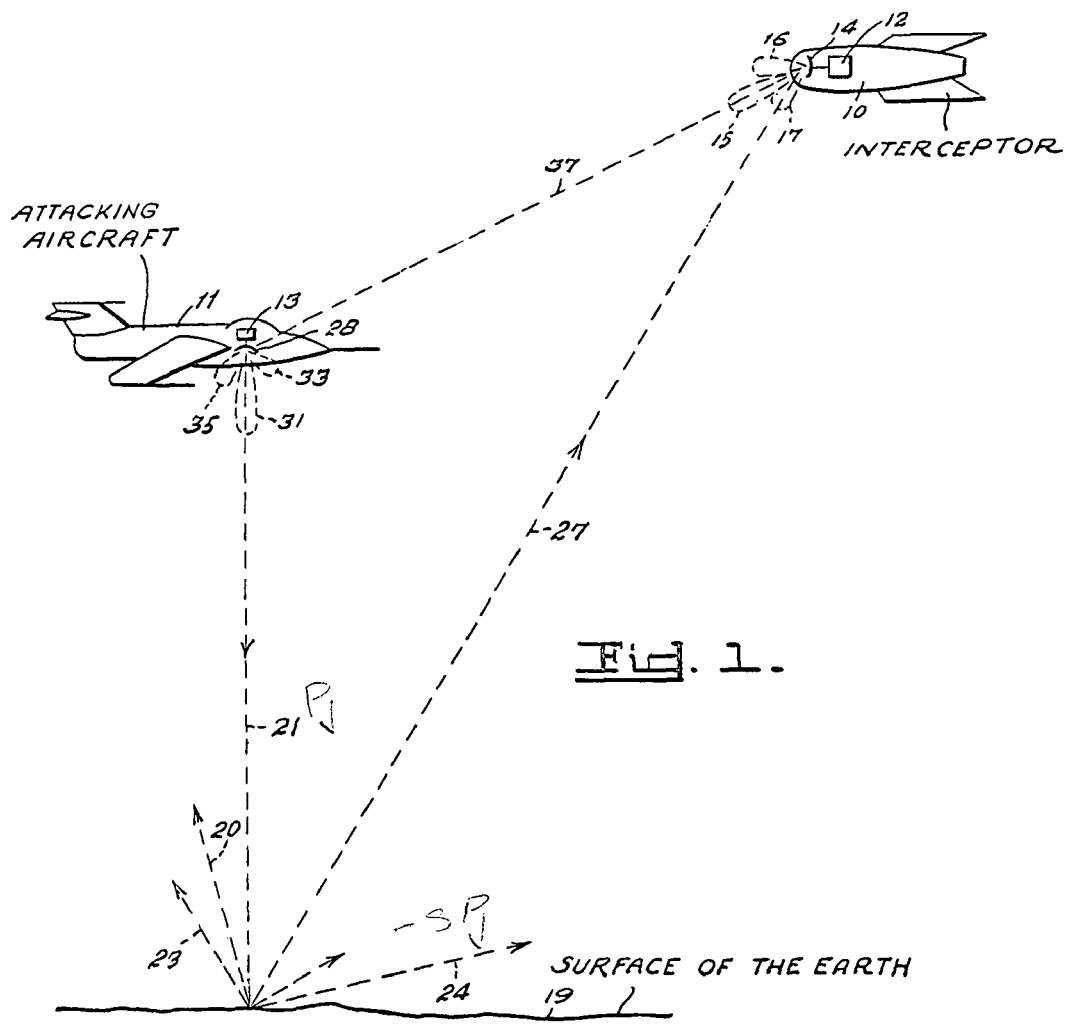

The present invention relates to the jamming of radar apparatus, particularly radar apparatus in airborne interceptors.

Present air defence systems make use of two principles of control of interceptors. The "close ground control" principle requires that each interceptor be carefully controlled by radar apparatus and associated equipment on the ground, with almost all navigational and other control information transmitted from ground to the interceptor. "Loose control" air defence systems make use of only limited ground control and the interceptors in such loose control systems complete their missions more or less independently with only rudimentary control information from the ground. In general, loose control systems have greater immunity from electronic counter measures directed against them by attacking bombers or missiles.

The available electronic counter measures for jamming interceptor radar apparatus are not completely satisfactory. Simple electronic noise jamming is ineffective against "home-on-jam" interceptors which have equipment providing directional control by making use of the jamming signal instead of the radar reflection signal. Another type of jamming device makes use of an inverse gain repeater which repeats the signal transmitted by the interceptor radar set so as to create distorted "echo" signals in the radar receiver which "unlock" the radar. However, such inverse gain repeaters are as presently used ineffective when used against monopulse radar sets and against Lobe-on-Receive Only radar equipment. A number of other specialized jamming techniques are available but these are at best effective only against specific types of interceptor radar systems. Chaff provides relatively little protection against presently known radar techniques. While aerodynamic decoys are often effective, in practice it may be impossible to carry such decoys in sufficient number to ward off all interceptors when flying through heavily defended zones.

The present invention provides an electronic jamming technique which would combine the masking properties of a conventional jammer with the main advantage of decoys, i.e. the possibility of diverting the interceptor from the attacking bomber or missile to the decoy. Basically, the decoy is provided by creating a source of radio waves distant from the attacking aircraft carrying the jamming equipment. This source is created by scattering techniques, and preferably by scattered radiation from the surface of the earth.

The present invention therefore provides, a method of jamming radar apparatus comprising directing a narrow jamming radio beam towards some scattering surface (Ordinarily the surface of the earth). After scattering, the jamming radiation appears to an interceptor as though it were emenating from the scattering surface. Therefore, the interceptor radar apparatus, instead of homing on the attacking flying object, will in most cases be rendered ineffective by the jamming or diverted towards the scattering source and will miss the bomer or missile.

In general the interceptor will not be flying directly beneath the attacking aircraft and therefore will not intercept directly the narrow beam of jamming radiation transmitted from the attacking aircraft towards the surface of the earth. However, a number of side lobes will, in general, characterize the antenna pattern for the jamming apparatus and it is therefore necessary to attenuate the side lobes sufficiently so that no significant source of radiation from the direction of the attacking object is detected by the interceptor.

Figure 2:
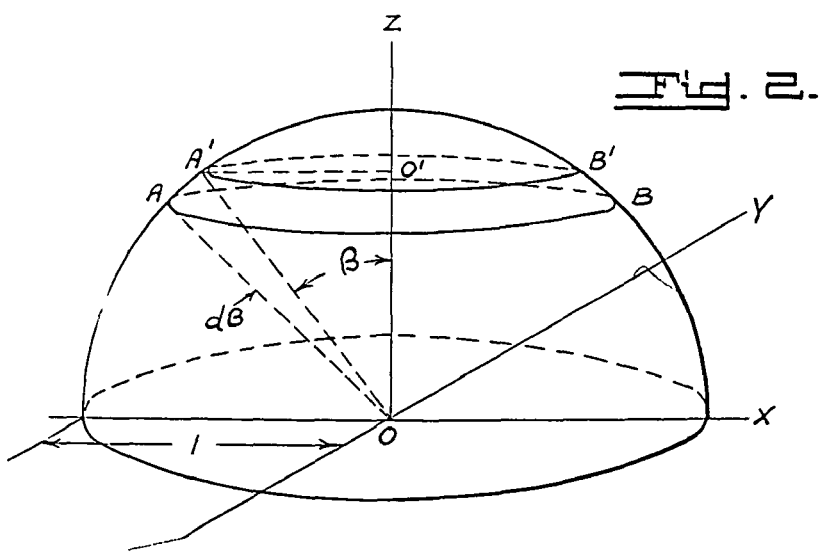

The invention will now be described with reference to the accompanying drawings in which:

FIG. 1 is a schematic diagram illustrating a configuration of an attacking aircraft and an interceptor and in which the attacking aircraft is shown employing the jamming method according to the invention, and FIG. 2 is a diagram for use in deriving the desired ratio of jamming power of the target aircraft jamming transmitter to the peak power of the interceptor radar transmitter.

In FIG. 1 an attacking aircraft, for example a bomber 11, is shown flying on a course within the principal lobe 15 of an antenna 14 of an interceptor radar unit 12, in an interceptor 10. The sizes of the aircraft and interceptor in the drawing are exaggerated relative to the distances one would expect them to be from one another and from the ground. The interceptor radar unit 12 is assumed to be of conventional design and mounted in conventional manner in the interceptor 10, which is searching for attacking missiles or bombers. The jammer may be, for example, of the noise or repeater type. Because the antenna 14 is directed to that part of the sky in which the bomber 11 is located, the radiation transmitted by the interceptor radar unit 12 includes a beam 37 striking the bomber 11 and reflected back to the interceptor radar unit 12. In the absence of jamming, the interceptor 10 would respond to this target echo signal and align itself with the beam 37, thereafter maintaining the alignment in response to the target signal until close enough to destroy the bomber 11.

According to the invention, the bomber 11 is provided with a suitable jamming device 13 of conventional design which is provided with a narrow beam antenna 28 which radiates a narrow beam of radiation 21 having a frequency corresponding to the frequency of the interceptor radar unit 12. The beam 21 is directed towards the ground and scattered by a scattering surface which will ordinarily be the surface 19 of the earth. The scattered radiation is directed upwards in all directions, representative scattered rays being shown by the reference numerals 22, 23, and 24. In particular, a ray 27 of scattered radiation will fall within a side lobe 17 of the antenna 14 and will therefore effectively jam the interceptor unit, provided the ray 27 is of sufficiently high power. The interceptor unit 12 is thus unable to distinguish the echo signal produced by reflection of its own transmitted signal from the bomber 11 because of the effect of the jamming signal transmitted via ray 27, and will therefore be unable to provide proper guidance to the interceptor 10. If the radar unit 12 is switched from a "search" mode of operation to a "home on jam" mode, this will result in the interceptor's alignment with the ray 27, i.e. the jamming signal in the radar unit 12 will cause the interceptor 10 to "home on to" (direct itself towards) the source of jamming radiation. This source of course appears to the radar to be situated on the surface of the earth 19, and the interceptor will accordingly follow a suicide flight path towards the ground.

The method according to the invention is not 100% effective; it works best when the attacking aircraft flies at a lower altitude than the interceptor and at long and medium ranges. When the attacking aircraft flies at an altitude higher than that of the interceptor, the interceptor radar may pick up jamming radiation from the side lobes of the jamming radar antenna which are of higher power than rays reflected from the ground. Accordingly, if the interceptor switches to a home-on-jam mode of operation, it will fly towards the attacking aircraft rather than towards the ground. At very short ranges the method according to the invention may not be effective because the echo signal may be much stronger than the reflected jamming radiation from the terrain, or because the jamming radiation received directly from the attacking aircraft is more powerful than that received from the terrain.

In general, the particular choice of jamming frequency range will be determined by the known characteristics of the enemy's interceptor radar units. However, the choice of power output for the jamming device depends upon the scattering properties of the earth's surface and upon the echo area presented by the attacker as well as upon the characteristics of the interceptor radar unit. In order to ensure adequate scattered jamming power, a theoretical analysis reveals that it is necessary that the ratio of jamming power radiated by the transmitter of the target aircraft to the peak power of the interceptor's radar transmitter be at least as great as given by the following equation, the derivation of which is set out in Appendix A.

$$\frac{P_j}{P_r} = \frac{KGAL}{16\pi s H_i} \cdot \frac{(D^2 + 2H_i H_j - H_j^2)^{3/2}}{D^4} \quad (I)$$

where $P_j$ is the mean jamming power within the interceptor receiver's band width.

$P_r$ is the peak power of the interceptor's radar transmitter

A is the echoing area of the target (attacking aircraft)

$H_i$, $H_j$ are the altitudes of the interceptor and the jamming target aircraft, respectively D is the horizontal distance between the target and the interceptor K is the jamming-to-signal ratio required for effective masking G is the main beam power gain of the interceptor's antenna L is the main lobe to side lobe power ratio for a side lobe of the interceptor's antenna in the direction of the apparent source of scattered jamming radiation at the earth's surface.

s is the "scatter loss factor", i.e. that fraction of the energy transmitted in the downwardly direction which is scattered upwards.

In order that the jamming signal emanating from the jamming transmitter side lobes be smaller than that generated by the terrain scatter, analysis reveals that it is necessary that the side lobe gain in the jammer's antenna in any direction be less than the value given by the following equation; the derivation of which is set out in Appendix B:

$$T < \frac{8sH_i}{\pi L} \cdot \frac{D^2}{(D^2 + 2H_j H_i - H_j^2)^{3/2}}. \quad (II)$$

where $T$ is the side lobe gain in the direction of the interceptor, and each of the other symbols have the same meaning as in Equation (I).

The significance of equations (I) and (II) can best be appreciated by a discussion of exemplary configurations of the interceptor and the attacking aircraft.

Example 1

Assume that the interceptor is equipped with an antenna of the type characterized by a principal lobe which falls off rather sharply to about 27 decibels below the beam centre value at just over 4 degrees off the beam centre, a first rather broad side lobe which peaks at about 6 degrees off the beam centre at about −18 decibels, and a second side lobe which peaks at −33 decibels at 17 degrees off the beam centre.

Assume further that the interceptor is flying at an altitude of 40,000 ft. and the attacking missile or bomber is flying at 10,000 ft. in such a configuration, assuming values of S/K=0.01, G=1,000 and A=100 ft.² it can be shown using equation (I) and (II) that the maximum jamming power required for the jamming transmitter amounts to only 3.5% of the interceptor radar transmitter power.

Example 2

Assume that both attacking aircraft and interceptor are flying at 10,000 ft.; otherwise, conditions are assumed to be the same as in Example 1.

With this configuration, the jamming power requirement as determined by equations (I) and (II) amounts to 5% of the interceptor radar power at a range of five miles, and increases rapidly at closer ranges. At more distant ranges the power requirement is below the 5% figure. The jamming technique according to the invention may therefore fail at some close range at which the jamming power is insufficient.

Considering the above examples, it appears that the attacking aircraft ought to maintain a low altitude. However, in so doing it is necessary to avoid creating a ground source of scattered radiation too close to the attacking aircraft, and the jamming transmitter might therefore be directed to a point on the earth's surface not directly beneath the attacking aircraft. This point should be selected so that if the interceptor follows a "home on jam" suicide path, the attacking aircraft does not at any time fall within the principal lobe of the interceptor antenna pattern.

In most tactical situations, the interceptor will try to lock-on its antenna to the target as early as possible. In the case of the present invention, therefore, the jamming signal being sufficiently strong at lock-on ranges, the interceptor would lock-on to the ground "decoy" and thereafter follow a descending intercept course. With the angle α (FIG. 1) always greater than the interceptor's antenna beamwidth, the real target would never be seen again, unless the interceptor changed back to the search mode at a sufficiently short range. This would never happen in the case of a homing missile, and is, in fact, unlikely even in the case of a manned interceptor, especially when on a collision course or in automatic "jam-track" mode. Accordingly, the attacking aircraft should fly at sufficiently high altitude to ensure that the angle α be at all times greater than the interceptor antenna beamwidth.

The jamming transmitter may be of conventional design, having regard to the assumed interceptor radar characteristics in individual cases. A repeater jammer which re-radiates the signal transmitted by the interceptor radar Would be most effective in some instances, as for example against a pulsed doppler radar unit. In other cases, for example, in most conventional manned interceptors, a regenerative repeater jamming transmitter may be preferable. An illustrative example of the design of a repeater jammer follows.

Example 3

The power flux $\Phi$ from the interceptor's transmitter is given by $$\Phi = \frac{P_r G\alpha}{4\pi D^2} \quad \text{(III)}$$

where $G\alpha$ is the antenna gain at angle $\alpha$ off beam centre, and all other symbols are as defined with reference to equation (I).

The input power $P_{in}$ at the jammer receiver is therefore $$P_{in} = A_j \Phi \quad \text{(IV)}$$

where $A_j$ is the effective cross-sectional area of the jammer receiver antenna.

The cross-sectional area for an antenna having a beam width O of 60° and operating at a wavelength $\lambda$ of 3 cm., assuming an antenna gain G of about $$\frac{25000}{0^2},$$

is given by the equation $$A_j \cong \frac{G\lambda^2}{4\pi} \cong \frac{1}{180} \text{ft}^2. \quad \text{(V)}$$

Combining equations (III), (IV) and (V), it follows that the ratio of jamming power $P_j$ to received interceptor radar power $P_{in}$ is given by the equation $$\frac{P_j}{P_{in}} = \frac{8.3 \times 10^{10} P_j D^2}{P_r G\alpha} \quad \text{(VI)}$$

If it is further assumed that at worst, $P_j = P_r$, then the ratio given by equation (VI) yields a value of about 125 decibels at range 20 miles. In other words, the jamming transmitter amplifier output must be 125 decibels above the input signal received from the interceptor radar transmitter. This is a realistic possibility having regard to presently available equipment.

Appendix "A"

Consider the jamming aircraft 11 and an interceptor 10 in the configuration shown in the drawing.

If the jamming power radiated downwards in the narrow beam 21 is $P_j$ (within a bandwidth corresponding to that of the interceptor's receiver), the total power scattered from the illuminated area of the ground is $sP_j$, where s is a "scatter loss factor" depending on the frequency, type of the terrain, polarization, etc.

Assuming, for the lack of any better information, Lambert's law for the distribution of the scattered energy, the power flux density at a unit distance from the illuminated ground area in the direction of the interceptor 10 (along ray 27) is:

$$\Phi(\beta) = \Phi(0)\cos\beta \quad \text{(A-1)}$$

where $\Phi(0)$ is the flux in the upward vertical direction.

The elementary ring' area AA' BB' (FIG. 2) is given by $$ds = 2\pi \text{A'O'} d\beta = 2\pi \sin\beta d\beta$$

Thus the total power scattered $$sP_j = \int_{\beta=0}^{\frac{\pi}{2}} \Phi(\beta) ds = 2\pi\Phi(0) \int_0^{\frac{\pi}{2}} \cos\beta \sin\beta d\beta$$
$$= \pi\Phi(0)$$

Hence $$\Phi(0) = \frac{sP_j}{\pi} \text{ and} \quad \text{(A-2)}$$

$$\Phi(\beta) = \frac{sP_j}{\pi}\cos\beta \quad \text{(A-3)}$$

At the interceptor's antenna the power flux is therefore $$\Phi(\beta) = \frac{sP_j}{\pi_r 2}\cos\beta \quad \text{(A-4)}$$

where r is the distance from the illuminated ground area to the interceptor 10.

As $$\left.\begin{array}{l} r^2 = D^2 + H_j2 + 2DH_j\cos(\alpha + \beta) \\ \cos(\alpha + \beta) = \dfrac{H_i - H_j}{D} \\ \cos\beta = \dfrac{H_i}{r} \end{array}\right\} \quad \text{(A-5)}$$

Rewriting $\Phi$, one obtains $$\Phi(\beta) = \frac{sP_j H_i}{\pi(D^2 + 2H_j H_i - H_j^2)^{3/2}}$$

If the interceptor's radar power transmitted is $P_r$, antenna gain, G and the radar is looking towards the target (the worst edge front the point of view of the jammer) the power flux at the interceptor's antenna due to the target echo is:

$$\Phi = \frac{P_r GA}{(4\pi D^2)^2} \quad \text{(A-7)}$$

where A is the echoing area of the jamming aircraft.

If the interceptor's receiving antenna gain in the directions of the ground and the target is $G(\alpha)$ and G respectively, jamming can be effective when $$\Phi_r(\beta)G(\alpha) = K\Phi G \quad \text{(A-8)}$$

where the "jamming masking factor" K>1.

From (A-6), (A-7) and (A-8), and putting $$L = \frac{G}{G(\alpha)} \quad (A-9)$$

one finally obtains the ratio of the jamming and radar powers required for effective jamming:

$$\frac{P_j}{P_r} = \left[\frac{KG\ A}{16\pi s H_i}\right]\left[\frac{(D^2 + 2H_j H_i - H_j^2)^{3/2}}{D^4}\right]L \quad (A-10)$$

In this formula, L simply represents the main-lobe to side-lobe ratio for a side-lobe in the direction of the illuminated ground area as seen by the interceptor. It has to be evaluated from the radar antenna radiation pattern for any angle $\alpha$ involved, determined by the equation:

$$\sin\alpha = \frac{H_j}{D}\sin\beta \quad (A-11)$$

Appendix "B"

An ancillary requirement is for the jamming signal in the interceptor's receiver caused by the jammer's side lobes in the direction of the interceptor to be smaller than that generated by the ground scatter.

The power flux F at the interceptor 10 due to the side lobe at the jamming transmitter is given by:

$$F = \frac{P_j \Gamma}{4\pi D^2} \quad (B-1)$$

where $\Gamma$ is the jammer's antenna side-lobe gain in the direction of the interceptor, and other symbols are as previously used.

In the worst case, when the interceptor's antenna is looking towards the jamming aircraft, the signal at the receiver's input due to (B-1) is proportional to G, whereas that due to scatter is proportional to G ($\alpha$) (these terms are defined in Appendix "A"), therefore, (from B-1 and A-6):

$$\frac{2sP_j H_i G(\alpha)}{\pi^2 (D^2 + 2H_j H_i - H_j^2)^{3/2}} > \frac{P_j \Gamma G}{4\pi D^2} \quad (B-2)$$

or $$\Gamma < \frac{8sH_i}{\pi L}\left[\frac{D^2}{(D^2 + 2H_j H_i - H_j^2)^{3/2}}\right] \quad (B-3)$$

The embodiments of the invention in which an exclusive property or privilege is claimed are defined as follows:

1. A method of jamming radar apparatus comprising producing a narrow beam of radiation of frequency within the frequency range of the radar apparatus from a source comprising a transmitter in a flying object, and directing the beam towards a scattering surface of the earth distant from the source of the beam, wherein the ratio of the mean jamming power $P_j$ of said beam to the peak power $P_r$ of said radar apparatus is at least as great as $$\frac{KGAL}{16\pi s H_i} \cdot \frac{(D^2 + 2H_i H_j - H_j^2)^{3/2}}{D^4}$$

where
  K is the minimum ratio of jamming signal to echo signal required to jam the radar apparatus,
  G is the main beam power gain of the antenna of the radar apparatus in the direction of the source of said narrow beam,
  A is the echoing area of said flying object,
  L is the main lobe to side lobe power ratio for a side lobe of the antenna of said radar apparatus in the direction of the area of said scattering surface illuminated by the narrow beam,
  D is the horizontal distance between the radar apparatus and the flying object,
  $H_i$ is the altitude of the radar apparatus,
  $H_j$ is the altitude of the flying object, and
  S is the fraction of the energy of the narrow beam that is scattered upwards.

2. A method of jamming radar apparatus comprising producing a narrow beam of radiation of frequency within the frequency range of the radar apparatus from a source comprising a transmitter in a flying object, and directing the beam towards a scattering surface of the earth distant from the source of the beam, wherein the ratio of the mean jamming power $P_j$ of said beam to the peak power $P_r$ of said radar apparatus is at least as great as $$\frac{KGAL}{16\pi s H_i} \cdot \frac{(D^2 + 2H_i H_j - H_j^2)^{3/2}}{D^4}$$

where
  K is the minimum ratio of jamming signal to echo signal required to jam the radar apparatus,
  G is the main beam power gain of the antenna of the radar apparatus in the direction of the source of said narrow beam,
  A is the echoing area of said flying object,
  L is the main lobe to side lobe power ratio for a side lobe of the antenna of said radar apparatus in the direction of the area of said scattering surface illuminated by the narrow beam,
  D is the horizontal distance between the radar apparatus and the flying object,
  $H_i$ is the altitude of the radar apparatus,
  $H_j$ is the altitude of the flying object, and
  S is the fraction of the energy of the narrow beam that is scattered upwards, and wherein the side lobe gain for any lobe of the source of said narrow beam is less than $$\frac{8SH_i}{\pi L} \cdot \frac{D^2}{(D^2 + 2H_i H_j - H_j^2)^{3/2}}.$$

3. Airborne apparatus for jamming radar apparatus comprising a transmitter mounted in a flying object and equipped with an antenna for directing towards the surface of the earth a narrow radio beam having a frequency corresponding to that of said radar apparatus, the ratio of the mean jamming power $P_j$ of said beam to the peak power $P_r$ of said radar apparatus is at least as great as $$\frac{KGAL}{16\pi s H_i} \cdot \frac{(D^2 + 2H_i H_j - H_j^2)^{3/2}}{D^4}$$

where

K is the minimum ratio of jamming signal to echo signal required to jam the radar apparatus, G is the main beam power gain of the antenna of the radar apparatus in the direction of the source of said narrow beam, A is the echoing area of said flying object, L is the main lobe to side lobe power ratio for a side lobe of the antenna of said radar apparatus in the direction of the area of said scattering surface illuminated by the narrow beam, D is the horizontal distance between the radar apparatus and the flying object, $H_i$ is the altitude of the radar apparatus, $H_j$ is the altitude of the flying object, and S is the fraction of the energy of the narrow beam that is scattered upwards.

4. Apparatus as defined in claim 3, wherein the side lobe gain for any lobe, of the source of said narrow beam is less than $$\frac{8SH_i}{\pi L} \cdot \frac{D^2}{(D^2 + 2H_i H_j - H_j^2)^{3/2}}.$$

* * * * *